United States Patent
Grant et al.

(10) Patent No.: US 6,222,827 B1
(45) Date of Patent: Apr. 24, 2001

(54) TELECOMMUNICATIONS NETWORK MANAGEMENT SYSTEM

(75) Inventors: Colin Grant; Matthew Faupel; Graham French, all of Cambridge; David Bending, Cambridgeshire; Phil Heighes, Cambridge, all of (GB)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/091,872
(22) PCT Filed: Dec. 20, 1996
(86) PCT No.: PCT/FI96/00687
§ 371 Date: Jun. 25, 1998
§ 102(e) Date: Jun. 25, 1998
(87) PCT Pub. No.: WO97/24834
PCT Pub. Date: Jul. 10, 1997

(30) Foreign Application Priority Data

Dec. 28, 1995 (GB) .................................................. 9526612

(51) Int. Cl.$^7$ .................................................. H04L 12/28
(52) U.S. Cl. .................................................. 370/254; 709/223
(58) Field of Search .................................................. 370/241, 242, 370/244, 245, 248, 237, 252, 254, 255, 400, 401; 709/217, 223, 224; 707/1, 2, 200

(56) References Cited

U.S. PATENT DOCUMENTS 5,363,473  11/1994  Stolfo et al. .

FOREIGN PATENT DOCUMENTS

| 2 308 777 | 7/1997 | (GB) . |
|---|---|---|
| 2 308 779 | 7/1997 | (GB) . |
| 07273764 | 10/1995 | (JP) . |
| WO 91/11766 | 8/1991 | (WO) . |
| WO 93/18598 | 9/1993 | (WO) . |
| WO 94/06232 | 3/1994 | (WO) . |
| Wo 95/20297 | 7/1995 | (WO) . |
| WO 96/21324 | 7/1996 | (WO) . |
| WO 96/38950 | 12/1996 | (WO) . |
| WO 96/38953 | 12/1996 | (WO) . |

OTHER PUBLICATIONS

Copy of Search report for GB 2 308 779.
Copy of Search Report for Gb 2 308 777.
M. Jander, *Data Communications*, vol. 24, No. 1, "Network management and Security", p. 116–118, 1995.

*Primary Examiner*—David R. Vincent
(74) *Attorney, Agent, or Firm*—Altera Law Group, LLC (57) ABSTRACT

A system for managing a telecommunications network comprises a core part storing all objects used by the system as master copies, and at least one peripheral part containing applications stored in the user workstation, through which applications the services of the system are offered to the user, each peripheral part having separately stored copies of objects used by the applications of the peripheral part concerned. The actions made by an application and the changes resulting from said actions are recorded, and an indication of the actions is transmitted from the application to the core part. When the network to be managed sends an indication of a change, the indication is transmitted to those applications that have copies of the objects to which the change relates. If the application receiving the indication has stored actions of which no indication has been sent to the core part, in the application; (a) all changes relating to the pertinent actions that have already been made are reversed, (b) the changes received from the network are applied, and (c) the recorded actions are reapplied.

2 Claims, 5 Drawing Sheets

TELECOMMUNICATIONS NETWORK MANAGEMENT SYSTEM

The present invention relates to a system in accordance with the preamble of the attached claim 1 for managing a telecommunications network. The telecommunications network to be managed may be for example a SDH (Synchronous Digital Hierarchy) network, a PDH (Plesiochronous Digital Hierarchy) network, or a combination of such networks.

The basic situation in network management is usually such that an operator managing a telecommunications network, e.g. a telephone company, has a plurality of customers (i.e. network users) in addition to the physical network. The operator sells the customers various services that utilize the network. (A public network will be used herein as an example; in principle, however, the same description applies to a private operator managing for example an organization network). To meet the data transmission requirements of customers in the physical network, the operator utilizes a number of facilities or operative processes for the provision of customer services. These operative processes can be divided into groups in accordance with the functions for which they are intended:

Service Provisioning, taking care of the performance of customer services, including for example invoicing customers for services.

Operation & Maintenance, for keeping the network operative to allow the usage of customer services. One of the most important functions in this respect is the supervision and repair of network faults.

Planning & Development, the function of which is to develop network operation so as to better meet customer needs and to increase the overall profitability of the operator enterprise.

As is apparent from the above, network management takes place on several different levels, depending on the extent to which the functions to be performed on a specific level are associated with the overall management of the operator enterprise. The management of a telecommunications network is generally divided into four different levels which are as follows from bottom to top:

network element management layer, network management layer, service management layer, and business management layer.

This division is used for example in ITU-T (the former CCITT) recommendation M.3010, which specifies a kind of framework for the management architecture of a telecommunications network. The bottom layer below the above four layers is the equipment itself; these equipments are managed by installation and field engineering tools.

The network element management layer means the management of an individual network element (such as a multiplexer or a cross-connect device) as a separate component without simultaneously paying attention to the condition of the network or other network elements. The majority of "network management" systems commercially available today are actually network element management systems within this layer.

The network management layer is concerned with the management of the entire telecommunications network, such as overall management of network connections. One example is the creation of connections and the end-to-end supervision of their condition. This means that for example alarms detected on equipment are not merely displayed against that equipment, but they are also propagated to show what services (paths and circuits) are affected by the fault, if any. The present invention is placed in this layer.

As distinct from the above, the service management layer is not concerned with technical network management. It takes care of customer data, supervision of services provided to customers, invoicing for services, and considering needs for services of different types, for example.

The business management layer is used to monitor and plan the business activities and economy of the entire enterprise, resulting in decisions affecting the lower levels.

At present, network management systems are changing into systems that manage the telecommunications network as a whole, whereas conventional management systems have handled only the remote control of transmission equipment, especially monitoring alarms produced by the equipment. In conventional network management methods, configuration changes, such as creation of new end-to-end connections, have been laborious and time-consuming, as the end result consists of several configuration events the prerequisite of which is that the maintenance staff of the network first gets an overall view of the situation and then decides on configuration changes required in individual network elements. In new network management systems, on the other hand, an overall view of the network and of its condition is produced within the system, and the system itself gives the required configuration commands to each transmission equipment. In consequence, all configuration changes can be performed significantly more rapidly than previously. Such developments have been accelerated by freeing of competition in the field of telecommunications.

Figure 1:
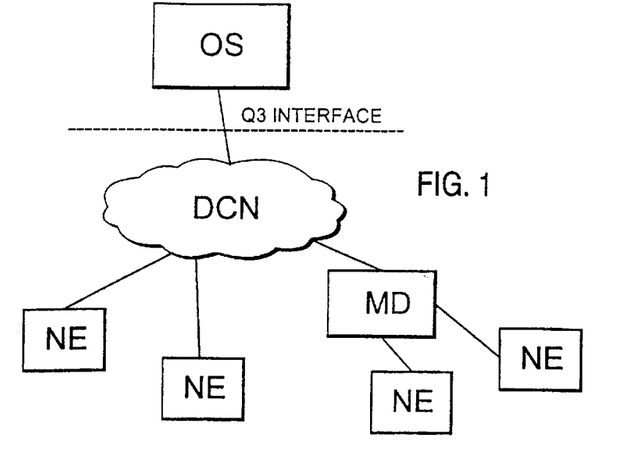
FIG. 1 illustrates a telecommunications network management architecture.

The above-mentioned recommendation M.3010 specifies the management architecture as shown in FIG. 1. The architecture basically consists of one or more operations systems OS connected to a data communication network DCN communicating with an actual telecommunications network which is to be managed and which includes the network elements NE managed. It is to be noted that the connections of the data communications network and those of the telecommunications network are logically distinct, although they can be implemented physically in one and the same cable. Hence, logically there are two networks: (a) a network providing services to customers, and (b) a network maintaining the service provisioning network. The management of certain transmission equipments (network elements) further requires a separate Mediation Device MD, which mainly acts as a protocol converter between a Q3 interface complying with the recommendations and transmission equipments that do not understand the protocol applied in the interface but use their own proprietary protocol. New SDH equipment, for instance, can be connected directly to the Q3 interface, whereas older PDH equipment requires a Mediation Device.

Figure 2:
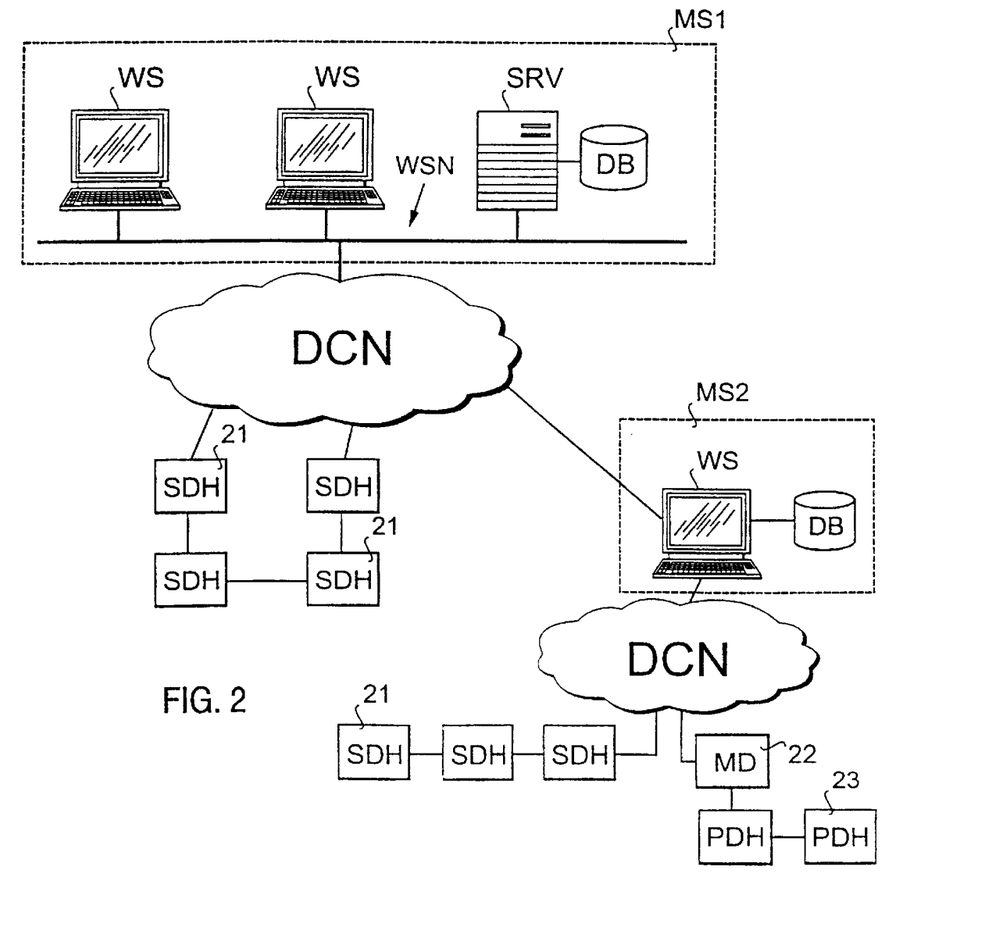
FIG. 2 shows an example of a management network for a combined SDH and PDH network.

In practice, a management network for a combined SDH and PDH network may be for example as shown in FIG. 2. Users (network operator staff) sitting at the operation centre use network management workstations WS connected to a separate local area network WSN, which may be for example an Ethernet network. The management system is typically distributed in several computers of the local area network, one of the computers being a dedicated server machine SRV having a database DB containing the information necessary for managing the network. In its practical embodiment, the local area network further comprises for example the necessary back-up devices (such as DAT drives or mirrored disks) and event-logging printers (not shown).

The management system is connected via the above-mentioned Q3 interface to the SDH network, for example. A variety of alternatives have been defined for the Q3 interface, so that the interface may be for instance an X.25-type packet-switched interface or an Ethernet LAN interface. (The packet-switched interface is useful if the operator in charge of the network management also otherwise uses a packet-switched network.) In practice, control channels between the SDH network elements 21 are established in the overhead bytes of the STM-N signal (N=1, 4, 16), so that control signals between SDH equipments propagate with the payload signal (that is, in the same physical network). Such control channels established in the overhead bytes are called Embedded Control Channels, and they are formed for example in the STM-1 frame by the section overhead bytes D1 to D12.

PDH equipments, on the other hand, need manufacturer-specific solutions, wherefore they have to be connected to the management system through a separate mediation device 22.

The management system may also be hierarchical, so that different geographical areas have their own smaller management systems that together form an integral management network. For instance, a management system covering one country may be divided geographically into smaller management systems operating in different parts of the country. Each smaller management system takes care of the management of the network portion in the geographical area concerned. In the example of FIG. 2, management systems MS1 and MS2 geographically apart from each other together form a single common management system and management network.

Network management standards are nowadays largely based on so-called object-oriented descriptions, although the standards do not require the use of this technique. Objects are data structures in a network management system, which describe the functions and the state of a network component. Hence, an object is an element having certain attributes ("I am like this") and certain operations ("I can do these things"). (In the object-oriented approach, objects with the same data structure (attributes) and the same behaviour (operations) are grouped into one class. A specific implementation of an operation is called a method, and each object is said to be an instance of its class.) A typical object is for example a cross-connect device with certain attributes (cross-connections that are active) and certain methods (e.g. make cross-connection and release cross-connection).

In a telecommunications network management system, objects can be physical or logical. Physical objects are elements that form part of the physical network. Such objects include for example the above-mentioned network elements (a network element is any piece of telecommunication equipment that works as a single unit to provide telecommunication functions) or physical connections (such as optical fibres, twisted pair cables, coaxial cables, radio links or satellite links). Logical objects are logical entities that do not form a single piece of the physical network. Such objects include for example paths and circuits. (A path is a connection of a fixed bit rate and format between two physical interfaces within the network. A circuit is a connection set-up for a customer, between two physical interfaces on the boundary of the network. Thus, a circuit usually comprises several consecutive paths.)

A network object may have a variety of attributes. Some attributes (such as "fault state") are used by several different object types. In addition, for some types of network objects (such as a route), it is convenient to define an attribute which consists of a collection of other attributes. Typical attributes include "availability status", "fault state" and "operational state". The attributes have different possible values, for example "fault state" may have values such as OK. There are no problems.

Warning. There are outstanding faults, but these do not affect services.

Degraded. Some or all of the services provided by the object are degraded.

Failed. All the services provided by the object are lost.

Unknown. The fault state of the object is unknown.

The "operational state" may have for example two different values:

Enabled. The object can operate, either completely or in part.

Disabled. The object cannot operate at all.

As will be described below, a network management system can make use of persistent objects to represent network elements and the such like. Changes to these objects come from two sources: the network being modelled, e.g. to represent faults that have occurred, and the user, e.g. to represent new services and equipment that have been configured.

As will also be described below, a network management system can be based on a system of distributing copies of these persistent objects to remote processes and allowing changes to be made to them local to that process; these changes are then sent to the core of the system to update the master copy of the object.

In a system of this kind, problems will be presented by in what way efficient operation of the system can be achieved in situations where, when a user application is making changes, a situation is simultaneously created in the network that requires changes to be made to the same objects to which the user application is currently making changes, as the changes made by the user application may conflict with the changes of the network.

There are two straightforward approaches to this problem. One approach is based on locking the objects. This approach involves marking all the objects that are being modified by some agent (an application or the network). If any second agent attempts to modify one of the objects, it notices the lock and waits until the lock is freed, which happens when the first agent has finished its modifications. This ensures that the above situation of having multiple modifiers of an object never happens.

The disadvantage of this technique is that some operations may take a significant amount of time, e.g. finding the optimum route for a circuit can take minutes to perform, so if the circuit routing application prevented any changes to the objects it was routing through for the whole of the period, it would result in the network being unable to report alarms on those objects for some minutes.

The second approach is based on abandoning lower priority changes. With this technique, if a higher priority modifier (i.e. the network) has changes that affect the same objects as a lower priority modifier (the application), the lower priority changes are abandoned. This can be achieved, for instance, by discarding the modified object of the application and replacing it with a copy of the object as modified by the network.

This approach has the disadvantage that any changes made by the application are lost. A network management system can allow applications to build up extensive changes before committing them to the database (e.g. so as to allow a number of user query dialogs to be presented); adopting this solution would mean the possibility of any user operation being aborted half-way through any time a network event arrived. As network events are frequent, but rarely have a detrimental effect on user operations, this approach is not satisfactory.

It is the object of the present invention to avoid the above disadvantages and to provide a novel method wherewith efficient system operation is achieved also in conflict situations of the above type. This object is achieved with the method of the invention, which is characterized by that which is set forth in the characterizing portion of the attached claim 1.

The invention is based on the fact that although network-originated changes to persistent objects are common, they rarely invalidate changes that user applications might be making to the same object. To give an example, a fault appearing on an object does not stop an application changing, for example, the comment field of the same object.

The idea of the invention is to record in terms of actions, i.e. on a higher level, what the user (application) is attempting to do instead of recording exactly what bits or bytes are modified, and to utilize the recorded actions for integrating the network and application changes. An indication of a change made in the network is transmitted to that application which has copies of the objects to which the change relates. Upon arrival of such an indication, the application checks whether actions have been recorded that have not yet been transmitted forward. If the answer is affirmative, the changes relating to these actions that have already been performed are reversed, the changes received from the network are applied, and said actions (which were previously recorded) are reapplied to test whether the changes desired by the application can still be made.

In the following, the invention and its preferred embodiments will be described in greater detail with reference to the example of FIGS. 3 to 9 of the accompanying drawings, in which.

Figure 3:
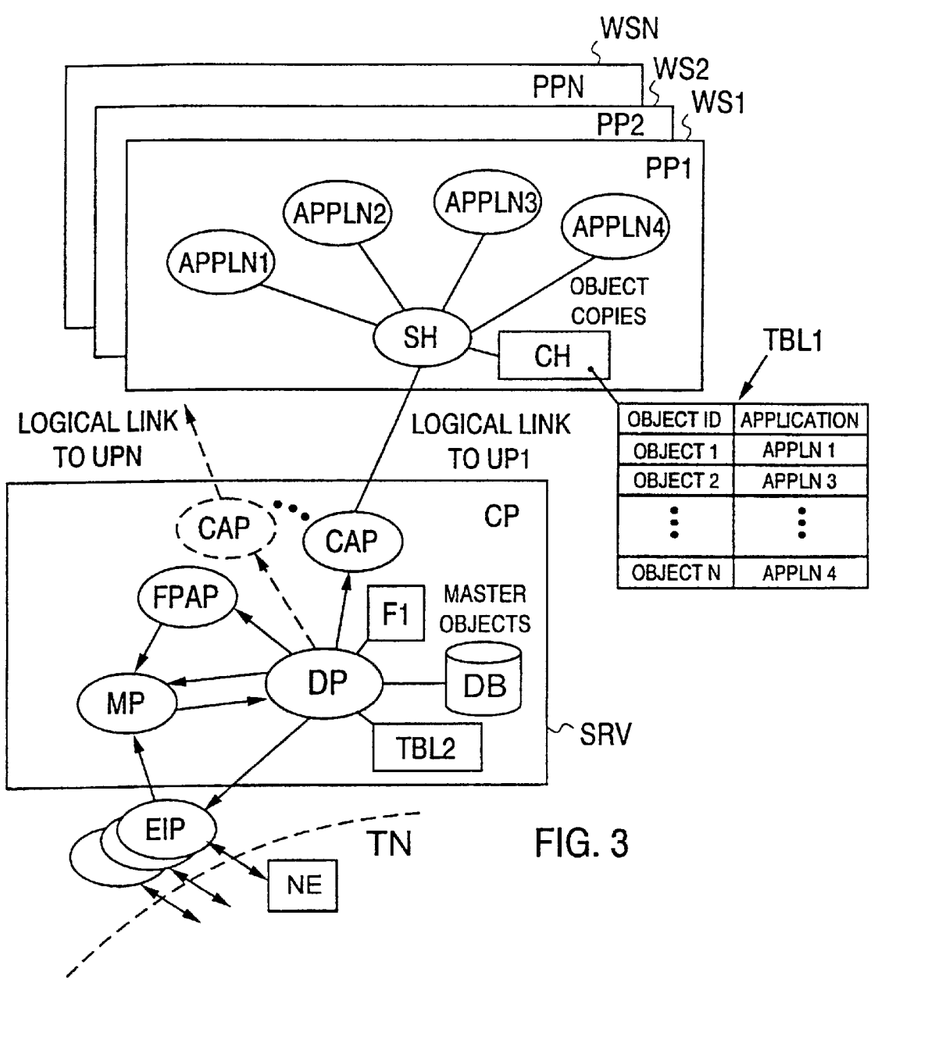
FIG. 3 illustrates the functional architecture of the management system in accordance with the present invention in its basic form.

The functional architecture of the management system in accordance with the present invention is illustrated in FIG. 3. A system with this kind of architecture is capable of operating for example in the system shown in FIG. 2. The system comprises a single core part CP and one or more peripheral parts PP1 . . . PPN, which are connected to the core part of the system. In this example, each peripheral part is intended for one user (operator employee) of the system.

The system typically has a dedicated core computer, such as a server SRV (also shown in FIG. 2). The core part of the system maintains an updated model of the state and the operation of the telecommunications network TN to be managed, of which a single network element is shown in the figure. As described earlier, the core part uses objects to keep up this model. The core computer SRV is connected to one or several workstations WS1 . . . WSN each including one peripheral part. The functional processes of the system, which run on the core computer and on the workstations, have been marked with ovals. These processes will be described in the following.

An application (indicated with references APPLN1 . . . APPLN4 in FIG. 3) is a functional system block that allows the user to configure the network and view network events on the screen of the workstation. The application is thus a system part offering the services of the system to the user. An individual workstation is therefore also called an application server.

A Session Handler SH is a functional system part that handles the session of a single user with the system and forwards messages between the core and the user applications. The Session Handler may be associated with the initial system log-on window through which a user logs on and establishes a session with the core. The Session Handler starts up various applications in accordance with commands given by the user. When the user logs off, the Session Handler performs the necessary closing-down and deregistering operations to terminate the session (the term registering will be explained later).

A Core Access Process CAP verifies that the Session Handler belongs to a known user on a known host. Having done so, it acts as the gateway to the system core. For each CAP in the core part there is a corresponding Session Handler in the peripheral part.

A Database Process DP controls access to the database DB to store persistent information (master objects of the management system). The main functionality of this process is:

to convert persistent objects to and from a storable format,
to store the current state of all persistent objects in the database DB and to keep that database up-to-date by the use of change and event messages sent to it by a Modelling Process MP of the core part,
to handle the forwarding of event information to interested parts of the system.

The Modelling Process MP is responsible for maintaining the core model of the managed network up-to-date and for dealing with changes to it. The main functions of the Modelling Process are:

to accept change and event indications from either EIP or CAP (i.e. either from the network or from the user) and validate them,
to apply changes to the model if they are valid and to determine the results of these changes,
to pass the changes to an appropriate External Interface Process EIP, if the changes require corresponding changes in the network to be managed,
to generate events based on the changes and events received (e.g. fault events on paths and circuits).

The External Interface Process EIP is a functional system part that converts data from the external world (data from the network to be managed) into the internal world of the management system. As far as the system user is concerned, he or she merely sees a network element NE, such as a multiplexer or a cross-connect device, without having to know the manufacturer or the version of the device. Different types of External Interface Processes are used for different classes of equipment. The main functionality of each EIP is:

to monitor the network for events and to exchange notifications with the network, to translate these events and notifications into equivalent events that are applied to the Modelling Process MP, to pass these events and notifications to the Modelling Process, to accept changes received from the Modelling Process; to translate them into the format of the network model; and to send them to the network and then inform the Modelling Process when all commands relating to each original change have succeeded, failed, or been timed out.

In fact, the Interface Processes could also be included in the core part, but FIG. 3 shows them separate, as they form the interface of the management system with the external world. In practice, communication with the external world can take place for example through a 7-layer OSI (Open Systems Interface) protocol stack defined for the Q3 protocol. The interface processes are described in the Applicant's parallel application GB-9526614.4, which is referred to for a more detailed description.

A Fault Propagation Agent Process FPAP is a functional system part that works out the actual impact of a received event in the system. In order to be able to do this, the FPAP uses information about the object class in question. It receives this information from the Database Process DP.

As the network elements cannot provide all the information needed by the applications, the database DB must store information for example about individual network elements and interconnections and interrelations between the network elements, the operations the network elements are capable of performing, and the services provided by the network elements. This information is stored in the form of an object model representing the transmission network TN in terms of objects and their attributes and methods performed on these attributes. Thus, an object is the representation, in the object model, of one of the resources to be managed.

Applications use these objects, which form the image of the network to be managed within the system. Therefore, they have to obtain objects from the core part of the system. An application can also create a new core object in database DB, e.g. as a result of a user command.

Applications also register to receive various events. The registration is passed to the Session Handler and further to the core part of the system. The registration is stored in the form of a filter F1 in association with the Database Process DP. This filter finds out, on the basis of the event type, which Core Access Processes and which applications a certain type of event is to be transmitted to (i.e. the users interested in a certain type of event). Events from the core of the system are duplicated in the Session Handler and sent to all applications that have registered to receive them. In this way, all applications of the user can receive the event at the same time, so that information presented to the user by the different applications is consistent.

In this way, the core part of the system knows which application a certain event has to be transmitted to. This also allows unwanted events to be filtered out as soon as possible (in the core) and reduces the bandwidth used between applications and the core part of the system. The core part is thus capable of filtering events up to the application level. It is also possible to use filters in steps, so that the core part knows only up to the level of the Session Handler which event has to be transmitted to the peripheral part. The Session Handler thereafter has a new filter, which indicates which event a specific application inside the Session Handler concerned is interested in. The first alternative, however, is to be preferred in that it does not make the peripheral part (Session Handler) too complicated.

The use of filters is described in the Applicants's parallel application GB-9526600.3, which is referred to for a more detailed description.

In accordance with the present invention, part of the objects stored in the core part of the management system are placed in a cache CH at each Session Handler SH. (Although a cache is a certain kind of memory, in this connection caching means only that a copy of something is kept in order to have fast access to it.) Thus, the Session Handler has a copy of any object an application has fetched from the core part of the system. Hence, the Session Handler also stores object-specific information indicating which one of its applications uses a specific object. This information can be stored for example in the form of a table TBL1 shown in FIG. 3. The core part likewise knows which Session Handler has a copy of a specific master object. This information can be stored in the form of a table TBL2 in association with the Database Process.

At system start-up, the Session Handler has no copies of objects. When the application needs a copy for the first time, the copy is fetched from the core part. As the retrieve message transmitted includes information specifying the object to be retrieved and the application that needs the copy, the Session Handler is capable of keeping up a table (TBL1) indicating which application uses a specific object, and the Database Process is able to keep up a table indicating which Session Handler uses a copy of a specific master object.

If an application fetches an object of which the Session Handler already has a copy, the application receives a copy of the object from the Session Handler without having to interact with the core part of the system. When the application ceases using an object, it transmits a message as an indication of this to the core part through the Session Handler, as a result of which the copy is removed from the memory of the Session Handler and the tables are updated accordingly. If the object is needed again, the copy is fetched from the core in the same way as at system start-up.

When changes are made to an object in an application, these changes are transmitted through the Session Handler to the core, which reapplies the changes to the master objects to keep the state of the master copies consistent with the state of the copies in the peripheral part. Once the changes have been accepted and validated by the MP and stored in the DB, they are passed on to all other interested Session Handlers and applications, so that their copies of these objects are updated.

Figure 4:
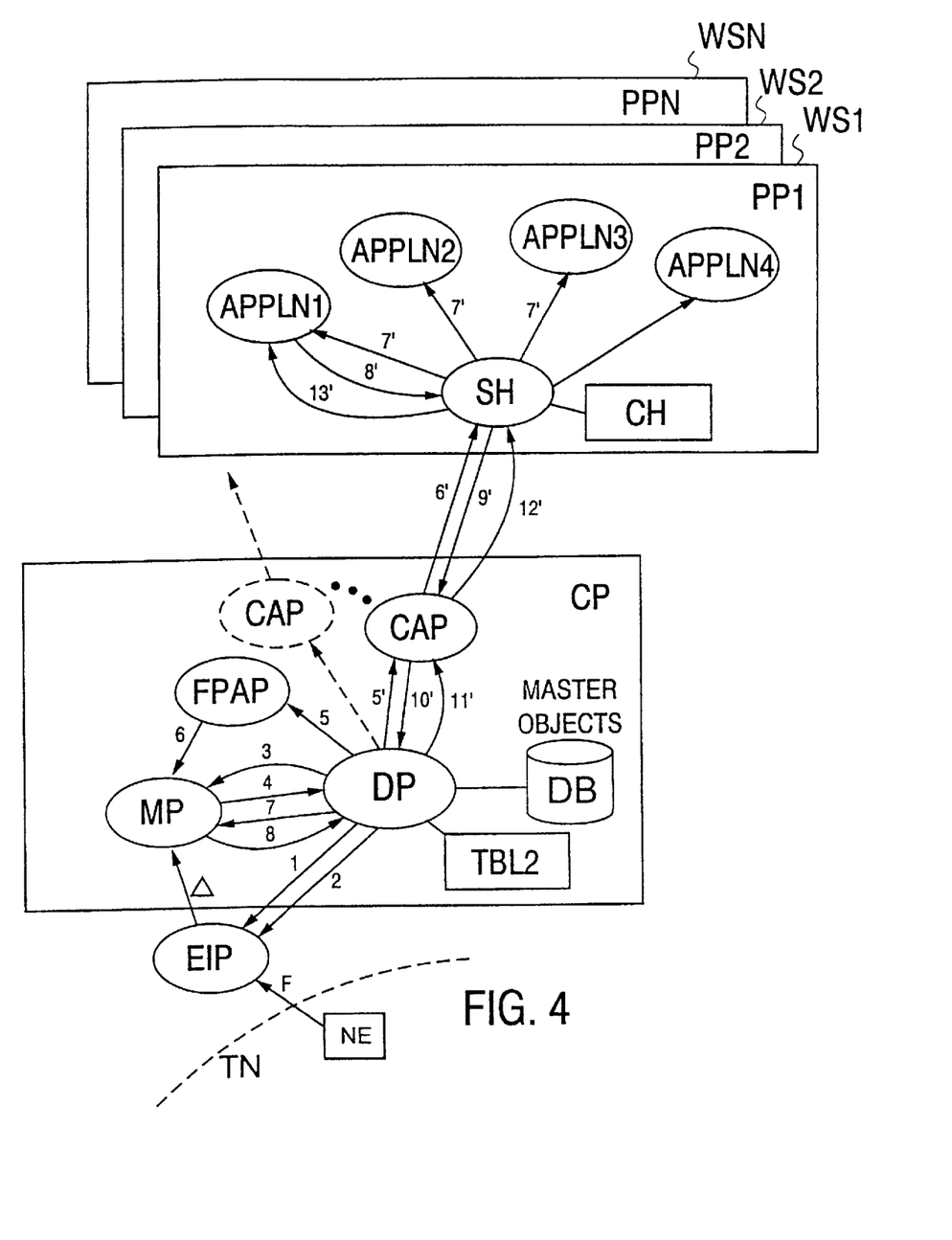
FIG. 4 illustrates the functioning of the system in accordance with FIG. 3.

In the following, the operation of the system in accordance with the invention will be described more fully with reference to FIG. 4, using an alarm from the network as an example. For the sake of clarity, filter F1 and table TBL1 are not shown in FIG. 4.

At first, a fault occurs in a network element NE of the network to be managed (a single network element is shown in the figure). The network element thus sends an alarm message F concerning the fault to the respective EIP. The EIP firstly retrieves the object that represents the particular network element from the database (arrow 1) and applies the change to that network element. Depending on the location of the fault, it may also be necessary for the EIP to retrieve objects associated with the first object (arrow 2). The fault indication may come for example from a 4×2 Mbit/s multiplexer, but the EIP finds out on the basis of the fault data and the multiplexer object it has retrieved that the actual fault is for example in one of its 2-Mbit/s input interfaces. The EIP thus finds out on the basis of the information it receives from the network which one of the system objects is concerned (e.g. the above-mentioned interface object) and what the fault is like.

The EIP then sends a notification of the object and the change occurred therein to the Modelling Process. This message is denoted by the reference Δ, which indicates that only information about the change that has occurred in the object is sent to the Modelling Process.

The Modelling Process thereafter obtains a copy of that object (arrow 3) from the database, applies the alarm to it, and sends it back as a delta (Δ) change message (arrow 4), which describes the changes in that (interface) object. Thus, at this stage the change has been updated in the database DB in a master copy of the object concerned. The fault code F received from the network to be managed can also indicate more than one alarm, which alarms are then similarly updated in the database. In accordance with a preferred embodiment of the invention, the Modelling Process can also implement caching of objects, so that frequently changed objects need not be repeatedly fetched from the database DB.

The Core Access Process CAP and the Fault Propagation Agent Process FPAP have previously registered to the Database Process DP to inform the Database Process of the type of events they are interested in to receive. As one of those types is a new fault, the delta change is then copied to the FPAP process (arrow 5).

As stated previously, the purpose of the FPAP process is to work out the actual impact of the fault within the management system. If for example the 2-Mbit/s interface is connected to a 2-Mbit/s path object which has for example up to 31 times 64 kbit/s circuit objects, the FPAP process will send a report (arrow 6) to the Modelling Process telling the Modelling Process MP to change the state of all these objects to "failed". On the basis of the received information, the Modelling Process retrieves all these objects from the database (arrow 7), changes them, and stores them again in the database DB (arrow 8). All of the related master objects in the database DB have now been updated.

At the same time as the delta change is copied into the FPAP, it is also copied into access processes CAP (arrow 5') that have registered to the Database Process as processes that want to receive an event of that type. Accordingly, the delta change is sent once from the Core Access Process in question to the corresponding Session Handler (arrow 6'). It may then be distributed n times among the applications (arrows 7').

Consequently, the Database Process has sent one message to the FPAP and one message to each CAP that wants to receive any event of that type. In the Session Handler the received message has been copied n times into all interested applications. Depending on the application in question, some of the applications (e.g. application 1 in FIG. 5) may then respond to the received message by asking for more information (arrow 8'). This message is then transmitted to the Database Process (arrows 9' and 10') and a reply is sent back (arrows 11', 12' and 13').

For some of the applications, the delta change (arrow 7') may not be sufficient, but the applications may also need the object to get more information on the actual impact of the delta change, for example. The applications are event-based. This means that when they receive an event (delta change), they act in accordance with predetermined rules, such as "get the object, process the object this way, present it on the screen of the workstation, apply it to the printer, and put it into a log".

It is further to be mentioned that the Object Model of the system stores information concerning the way in which information on a fault of each particular object class is forwarded. In consequence, the Database Process DP knows that for example in the case of the 2-Mbit/s interface object, fault information has to be forwarded to all objects that this interface object provides service for. However, if the fault is for example on one of the interfaces of a change-over unit providing protection at some level, the error is applied only to that interface (and not any further), as the system knows that this object has a back-up route, i.e., the path and circuits concerned are not out of service. In this way, the basic behaviour of the system in fault conditions can be modelled inside the management system.

In a system of the kind described above, in which the master copies are held in a persistent database and copies of the objects are held in the memory of the application, problems will emerge in a situation in which the network causes an object that the application (user) is modifying to change. Therefore, there must be a way of merging, within the system, the network changes with the changes that the application (i.e the user of the system) is making. A straightforward approach to this would be to reapply the changes made by the application to the version of the object that resulted from the network changes.

Figure 5:
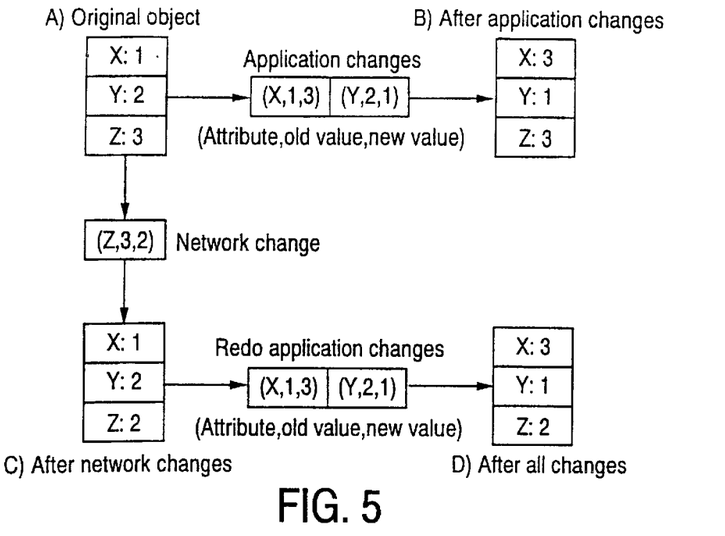
FIG. 5 illustrates a way of integrating network changes and application changes, FIG. 6 the way according to the invention of integrating network changes with application actions.

This approach is described in FIG. 5, where the object has three attributes: X, Y and Z. At the initial stage A, the object is modified by the application so as to arrive at state B. A network change then occurs; this is handled by first applying the change to the original object so as to arrive at state C and then reapplying the application changes to reach the merged state D. If there were a conflict (for instance because both the network and the application modify attribute Z), this would be spotted on reapplying the changes as the old value in the change record would not match the current value in the object. The attempt to merge the changes could then be abandoned, or some other conflict handling code called.

While this appears to work, it has a problem. Objects generally have internal consistency rules that define valid states for the data within the object, and valid transitions between those states. For instance, the above object may have a rule that states that it is invalid for X to have value 3 while Z has value 2. Thus, although there is no direct conflict between which attributes are modified, the end result D has left the object in an invalid state. While these violations of static rules might be detectable, violations of dynamic rules are more difficult to spot, especially as they are often implicit in the code of the object rather than stated explicitly.

To solve this problem, the present invention goes one stage further, which is to record actions as well as changes. Actions are indivisible operations on objects which are guaranteed to only change objects in accordance with their rules and to leave any affected objects in a consistent state. These actions are then replayed in order to repeat the changes made by the application, and because the actions themselves detect whether they are violating the consistency of the objects, it is ensured that if one succeeds in replaying them, all objects are in a consistent state and changes made by the application and by the network have been successfully merged.

Figure 6:
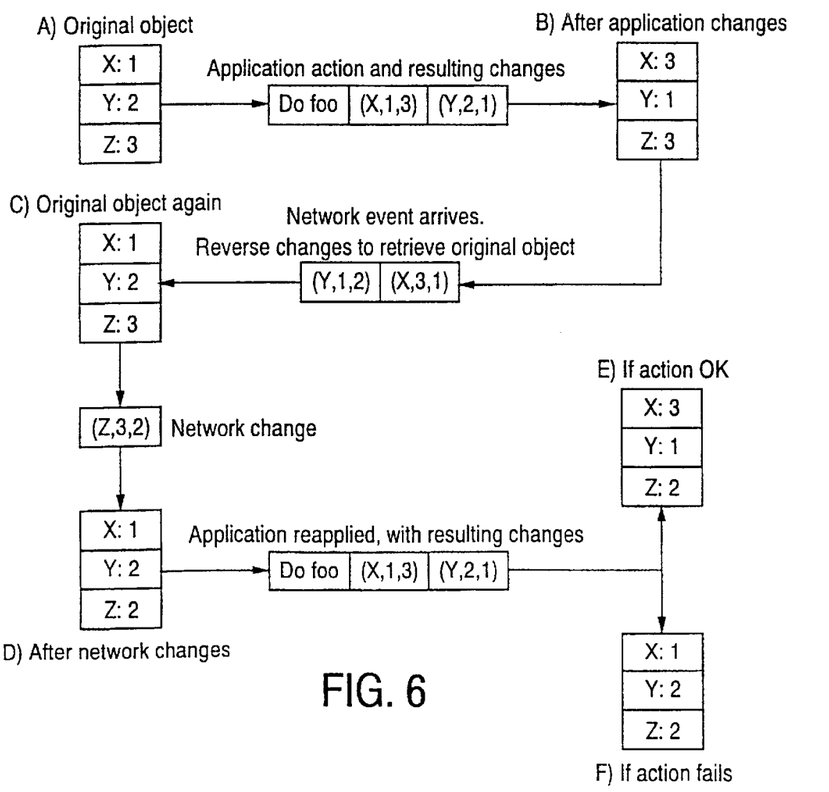

FIG. 6 is a diagram showing what happens when network changes override an application. The figure shows one object having attributes X, Y and Z.

When a user makes changes at his workstation, the actions are recorded, i.e., the application creates in its memory a record of things that the user is attempting to do, looking at the situation from the point of view of the application level. After the changes, the object moves to stage B. When the network to be managed sends an indication of a change made in the network, the indication is transmitted to those applications that have copies of the objects to which the change relates. If the application receiving the indication has stored actions of which no indication has been sent to the core part maintaining the master copies, the following operations are performed by the application:
1. all changes relating to the pertinent actions that have already been made are reversed. This gives stage C, in which the application again has the original version of the object.
2. the changes received from the network are applied, which gives stage D.
3. the recorded actions are reapplied.

FIG. 6 shows the crucial difference with this approach—that there can be two outcomes. If the action is still valid when reapplied, the object has the result of merging both sets of changes; if the action is not valid though, no changes are made and the object is left as it was before the action was reapplied.

FIG. 6 also shows that changes are still recorded in addition to actions. The process shown above has two points at which the object has to be changed to match a different version of the object. At B it has to revert to the state it had before the application changes were made and at C it has to change to reflect the network changes. This can be achieved either by having copies of the object in the states that it might have to change to, or by keeping the delta changes between the versions of the object.

The system in accordance with the present invention takes the latter approach of recording the changes, as this has two advantages. Firstly, the changes to an object usually take less space to store than duplicate copies of the object, and so take less memory and are faster to pass around between processes. Secondly, only one copy of the object is kept, which simplifies the representation of references to the object: one does not have to worry about having to change any pointers to the old object when a newer object becomes the valid one.

Figure 7:
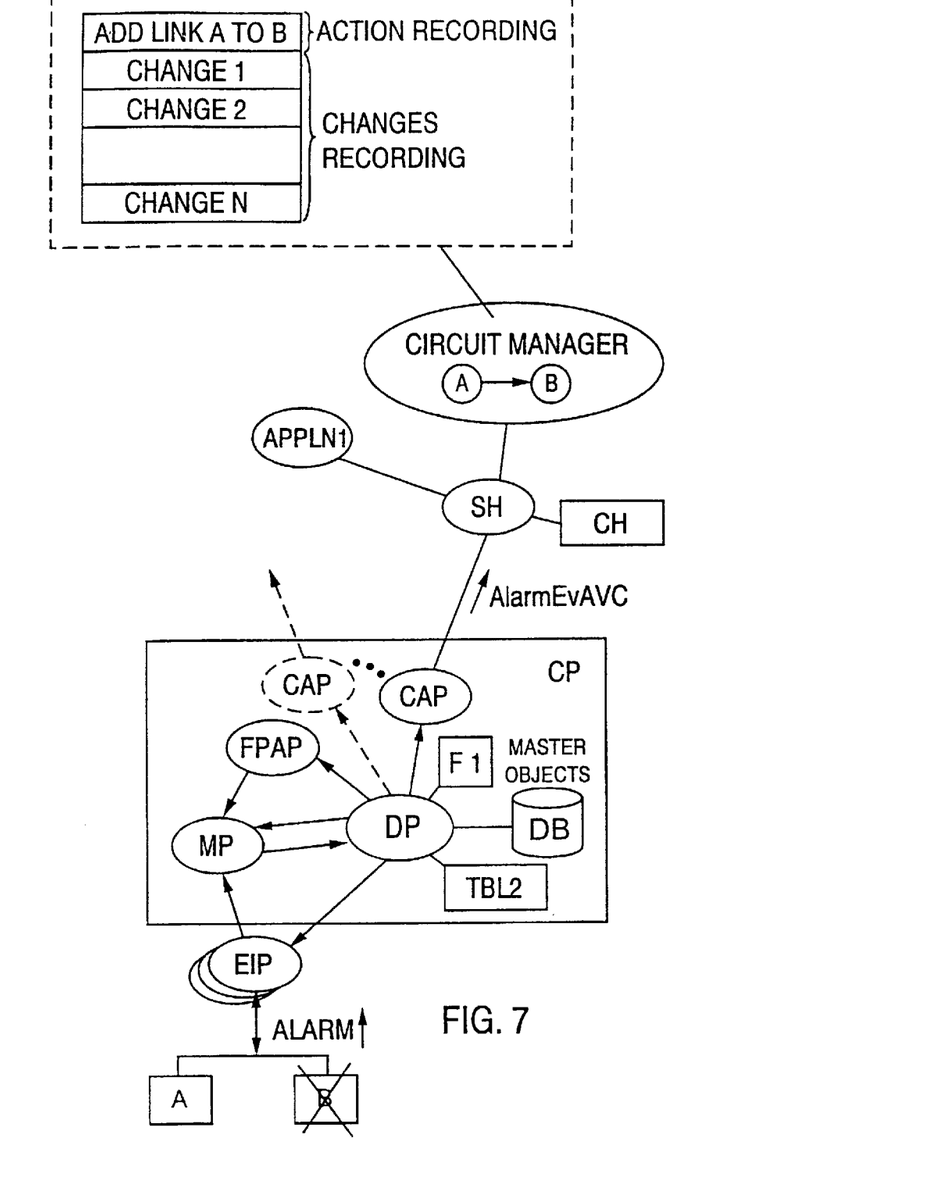
FIG. 7 illustrates the process used in the system for keeping the local copies consistent with the master copies and vice versa.

FIG. 7 illustrates the above procedure, using an application that creates circuits between objects as an example. If the user of the system wants to set up a circuit between two network elements, e.g. A and B, he or she gives a corresponding command from his workstation. Then the application in charge of setting up circuits (Circuit Manager in FIG. 7) creates a link between objects A and B representing the network elements A and B. This action is recorded in the application, as shown in FIGS. 6 and 7. This action then results in a set of changes (e.g., set attribute X of A to be Y, set attribute X of B to be Y, set direction . . . , etc.) in accordance with predetermined rules. These individual changes on individual parts of each object are then recorded, which is shown as the Changes Recording stage in FIG. 7.

In a normal case, the application transmits these actions through the Session Handler to the core part, and the core part reapplies the actions to the master objects, in order that the information of the core part on the objects would be consistent with the information of the application. The core part further transmits information on the resulting changes to all processes that have notified that they are interested in receiving such events.

When the application makes changes to the object, the core part may, however, receive information from the network to be managed indicating that there is a failure in network element B, for instance (which may mean for example that the link between objects A and B cannot be created). Hence, the core part immediately transmits a message to the application as an indication of the failure; in the figure, the message is indicated with the reference AlarmEvAVC (Attribute Value Change event). This message carries a description of a change to the attribute value in question (it is thus a message of the same kind as the delta message in FIG. 5). In this case, the received information means that there is now a new alarm in network element B. The application then proceeds through the following steps (as described above):
1. All changes that have been made at the Changes Recording stage are reversed, i.e., the application is returned to the same state in which it was before the circuit set-up command was given by the user. The process is now in stage C shown in FIG. 6.
2. Changes from outside the application are applied to the objects. In this example, this means that object B has to be moved into fault state by using the information contained in the AlarmEvAVC message.

At this stage (stage D in FIG. 6), the state of the objects (in this example object B) matches that of the objects in the core part of the system.

3. The Actions previously recorded are reapplied one by one, and if any action fails, the application is informed. Thus, the changes that the application made are retested to see whether they can still be made. This is because it is possible that the change that has occurred in the network was so insignificant that it is still possible to set up a circuit between network elements A and B.

The method in accordance with the invention ensures that the changes made are always performed on top of the core (as the changes made in the application are first removed and then the changes that have been made in the core are added).

In the above, the method of the invention has been described in general terms. The following is a more detailed description of the practical implementation of the method disclosed above.

Action Recording

Objects are changed through calling routines closely associated with them that hide the details of precisely what data is contained within the object and how it is manipulated. These routines are commonly known as methods. A collection of methods that provides a set of services is referred to as an interface. Different interfaces may be presented to different parts of the system; for instance an object may have one interface for applications to use and another interface for use by other objects within the system.

Within the network management system, all methods that form part of the interface presented by persistent objects to application writers are known as action methods, i.e. they implement an action as defined above. In accordance with the invention, extra code is added to these methods to record the action being performed, and further additional code is written to allow recorded actions to be played back at a later date. Essentially, the recording code records a unique identifier for the action plus the values of the parameters with which it was called and the replay code just unpacks the recorded parameters of the action and calls the original action method with those values.

The following pseudocode gives an example of the operations that need to be added for each action method (additional code is marked in italics). In the example, applyAction is a standard method called on a given object to replay an action that it recorded earlier.

```
class SomeClass
        method anActionMethod ( parameters ) is
            If recording actions
                Store paramecers in machine independent form
                in a buffer
                actionRecord := ( id of object, id of SomeClass, id of
anActionMethod, buffer )
                Store actionRecord in action store
                recording actions := False
                ...Rest of method
                recording actions := True
end
method applyAction( anAction ) is
        If anAction.classId <> id of SomeClass
            Call applyAction of superclass
        Else switch on anAction.actionId
            When id of anActionMethod
                Extract parameters of anActionMethod
                from anAction.buffer
                Call anActionMethod( parameters )
            When some other id ... etc.
end
```

The code to store and retrieve any parameter values can be generated automatically, which means that all of the above additional code can be created by a tool once a method has been identified as representing an action.

It is possible that some action methods can be called from within other action methods as well as from an application. It is only necessary to record an action when called from an application, so to avoid embedded actions also being recorded (which would be inefficient) a flag is used to indicate that actions need to be recorded. As shown above, this is set to false for the duration of the method so that embedded actions know that they do not need to record the fact that they have been called.

Change Recording

Recording changes to objects is achieved by only allowing access to object attributes via a "wrapper", which is a software module defining the way attributes can be changed and implementing said changes. This wrapper not only changes the attribute as requested, but also records a change to the attribute, if required. Part of the interface of the wrapper is a routine that can take a recorded change and use it to either modify the attribute to be in the same state as indicated by the change or to reverse the effects of the change on the attribute.

Figure 8:
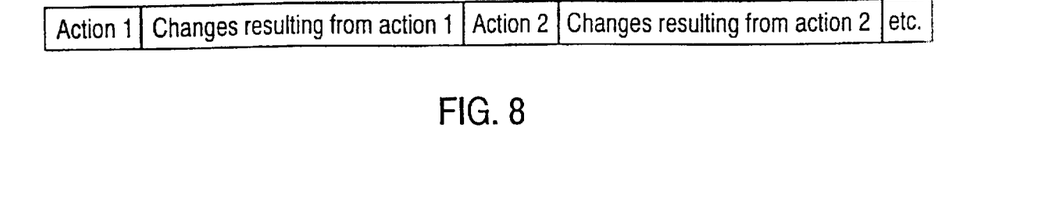
FIG. 8 illustrates the format of the change history stored within the system.

Both changes and actions are recorded in a single place in the memory of the peripheral part, resulting in a history of what the application has done with actions followed by the changes that were caused by the actions. This is illustrated in FIG. 8. As can be seen from the Figure, the format of the stored change history is such that each action is followed by the changes resulting from said action and the next action follows the changes of the previous action.

Handling Network Events

When an application receives network events, it checks whether it is in the middle of preparing some changes, i.e. whether there are changes and actions recorded that have not yet been committed to the central master database. If there are, then it performs the three steps described above:

1. Reverse any changes made by the application.
2. Apply the network changes received.
3. Reapply the actions previously recorded by the application.

As already discussed, the changes are reversed so as to ensure that when the network changes are applied to the objects, the local copies will change state in exactly the same way as the objects in the master database originally changed state, thus guaranteeing that the changes will all be valid.

The reversal is accomplished simply by stepping backwards through the changes recorded by the application (ignoring the actions) and reversing the change. So, if an attribute was changed for example from 3 to 5, it is changed back from 5 to 3; if an item was inserted into a list, it is removed, and so on. The necessary information is held in the change records to enable this reversal to take place.

The changes that the network has made are encoded in the same fashion as any other changes, so applying the changes is just a matter of stepping through each change and modifying the indicated object appropriately. The affected objects are now in the same state as the master objects in the main database.

The application then steps through the original actions that it recorded and applies each one in turn by calling the applyAction method mentioned above. Each will either succeed or fail. If it succeeds, it will be rerecorded along with the new resulting changes. If it fails, the application reverses any changes that it and all previous actions made, thus leaving all objects in the same state as in the main database.

Clearly, the arrival of network changes can sometimes result in application changes being abandoned. Also, not quite so obvious is the fact that although the application may be successful in reapplying its actions, these may result in different changes occurring when compared to the first time that they were applied.

The applications are made up of a generic part that deals with the complexities of interacting with the central database, keeping object copies up-to-date and so on, and a specific part that implements the behaviour of that application. As the process of merging of the network changes described above happens "behind the scenes", i.e. in the generic part of the application, some mechanism is required for informing the specific part when either of these two things occur, so that it can take whatever remedial action is needed.

This interaction is achieved through having the specific part of the application register two callback routines with the generic part, i.e. routines that are called back when something occurs. One routine is called when application changes are abandoned and the other when different changes occur the first time around.

The failure callback simply tells the application which particular action failed, allowing it to perform some sort of clean-up, e.g. telling the user that operation has failed due to an unrecoverable conflict with the network The callback that is called when the changes differ the second time around is slightly more complex. It tells the application which events from the first time around were not generated the second time and which new events were recorded the second time but not the first. The application can then interpret this information and decide whether the actions are still valid from its point of view. If it decides that they are not, it can tell the generic part of the application to undo all the actions anyway, even though they succeeded.

Even though the invention has been described above with reference to the example shown in the attached drawing, it is obvious that the invention is not restricted to that example, but it can be modified in many ways within the scope of the inventive idea presented above and in the attached claims. As mentioned above, the management system includes a variety of objects, representing both logical and physical entities. In the attached claims, all these objects are set forth as "the objects that relate to the network elements to be managed", i.e. as objects that represent the environment to be managed. Even though, in the typical example set forth above, the core part and peripheral parts are on different computers, and so may be geographically very far from each other, it is equally possible to use the entire system on one and the same computer (which is typically a UNIX computer).

The above mentioned parallel application 9526600.3 and 9526614.4 are hereby incorporated by reference.

What is claimed is:

1. A system for managing a telecommunications network, said telecommunications network comprising several network elements to be managed by the system, said system comprising a management center having at least one workstation providing a man-machine interface and allowing a manager to control the system, and the system being capable of providing the manager with information on the network, said at least one workstation being connected to a database containing information about the network to be managed, said information being in the form of objects that relate to the network elements to be managed and in the form of references between the different objects, said references indicating the dependencies between the objects, wherein management centre is connected to said network elements by data communication links such that the manager can initiate an operation on and receive information from a network item to be managed, characterized in that the system comprises a core part storing all objects used by the system as master copies, and at least one peripheral part containing applications stored in the user workstation, through which applications the services of the system are offered to the user, each peripheral part having separately stored copies of objects used by the applications of the peripheral part concerned, the actions made by an application and the changes resulting from said actions are recorded, and an indication of the actions is transmitted from the application to the core part, when the network to be managed sends an indication of a change, the indication is transmitted to those applications that have copies of the objects to which the change relates, if the application receiving the indication has stored actions of which no indication has been sent to the core part, in the application (a) all changes relating to the pertinent actions that have already been made are reversed, (b) the changes received from the network are applied, and (c) the recorded actions are reapplied.

2. A system according to claim 1, characterized in that the changes to an object are recorded by storing one copy of the object together with the changes between the different versions of said object.

* * * * *